(12) United States Patent  
Bennin et al.

(10) Patent No.: US 6,612,016 B1
(45) Date of Patent: Sep. 2, 2003

(54) METHOD OF MAKING INTEGRATED LEAD SUSPENSION FLEXURE WITH BALANCED PARALLEL LEADS FOR INSULATOR LAYER HYGROTHERMAL COMPENSATION

(75) Inventors: Jeffry S. Bennin, Hutchinson, MN (US); Todd W. Boucher, Stewart, MN (US); Anthony J. Liberko, Hutchinson, MN (US); Raymond A. Loehlein, Mound, MN (US); Robert J. Matz, Cologne, MN (US); Gabriel M. Montes, Hutchinson, MN (US); Karupanan Supramaniam, Hopkins, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 10/027,050

(22) Filed: Dec. 20, 2001

Related U.S. Application Data

(62) Division of application No. 08/993,083, filed on Dec. 18, 1997, now Pat. No. 6,381,100.

(51) Int. Cl.[7] ............................................. G11B 5/127
(52) U.S. Cl. ........................... 29/603.03; 29/603.04; 216/22
(58) Field of Search ............... 29/603.03, 603.04, 29/830, 603.18, 603.16; 360/245.5, 245.9; 216/22

(56) References Cited

U.S. PATENT DOCUMENTS

| 4,543,295 A | 9/1985 | St. Clair et al. |
| 4,616,279 A | 10/1986 | Poorman |
| 4,789,914 A | 12/1988 | Ainslie et al. |
| 4,996,623 A | 2/1991 | Erpelding et al. |
| 5,103,359 A | 4/1992 | Marazzo |

(List continued on next page.)

FOREIGN PATENT DOCUMENTS

| EP | 0 599 669 A2 | 6/1994 |
| EP | 0 764 942 A1 | 3/1997 |
| EP | 0 834 865 A1 | 4/1998 |
| GB | 2 292 826 | 3/1996 |
| GB | 2 295 918 | 6/1996 |
| GB | 2 312 082 | 10/1997 |
| JP | 53-19015 | 2/1978 |
| JP | 53-30310 | 3/1978 |
| JP | 60-246015 | 12/1985 |
| JP | 4-146516 | 5/1992 |
| JP | 9016932 | 1/1997 |
| JP | 9-251741 | * 9/1997 |
| WO | WO 95/13609 | 5/1995 |
| WO | WO 96/42080 | 12/1996 |
| WO | WO 97/35302 | 9/1997 |
| WO | WO 97/35303 | 9/1997 |
| WO | WO 97/36290 | 10/1997 |

*Primary Examiner*—A. Dexter Tugbang
(74) *Attorney, Agent, or Firm*—Faegre & Benson LLP (57) ABSTRACT

A method of forming a flexure for an integrated lead head suspension with a metal spring layer, a conductive lead layer and an insulator layer between the metal spring layer and the conductive lead layer. The method includes forming insulator suspended portions on a lower surface of the conductive lead layer and further includes forming insulator spring arm portions on an upper surface of the metal spring layer adjacent to the insulator suspended portions.

20 Claims, 9 Drawing Sheets

U.S. PATENT DOCUMENTS

| | | |
|---|---|---|
| 5,198,945 A | 3/1993 | Blaeser et al. |
| 5,331,489 A | 7/1994 | Johnson et al. |
| 5,391,842 A | 2/1995 | Bennin et al. |
| 5,422,764 A | 6/1995 | McIlvanie |
| 5,461,525 A | 10/1995 | Christianson et al. |
| 5,490,027 A | 2/1996 | Hamilton et al. |
| 5,491,597 A | 2/1996 | Bennin et al. |
| 5,594,607 A | 1/1997 | Erpelding et al. |
| 5,597,496 A | 1/1997 | Masaichi et al. |
| 5,598,307 A | 1/1997 | Bennin |
| 5,606,477 A | 2/1997 | Erpelding et al. |
| 5,608,591 A | 3/1997 | Klaassen |
| 5,617,274 A | 4/1997 | Ruiz |
| 5,630,948 A | 5/1997 | Ueda et al. |
| 5,631,786 A | 5/1997 | Erpelding |
| 5,645,735 A | 7/1997 | Bennin et al. |
| 5,661,896 A | 9/1997 | Erpelding |
| 5,666,717 A | 9/1997 | Matsumoto et al. |
| 5,673,484 A | 10/1997 | Masaichi et al. |
| 5,680,275 A | 10/1997 | Frater et al. |
| 5,687,479 A | 11/1997 | Bennin et al. |
| 5,699,212 A | 12/1997 | Erpelding et al. |
| 5,701,218 A | 12/1997 | Boutaghou |
| 5,719,726 A | 2/1998 | Hayakawa |
| 5,734,524 A | 3/1998 | Ruiz |
| 5,739,982 A | 4/1998 | Arya et al. |
| 5,754,368 A | 5/1998 | Shiraishi et al. |
| 5,757,585 A | 5/1998 | Aoyagi et al. |
| 5,781,379 A | 7/1998 | Erpelding et al. |
| 5,796,556 A | 8/1998 | Boutaghou |
| 5,805,381 A | 9/1998 | Resh |
| 5,835,306 A | 11/1998 | Bennin |
| 5,982,584 A | 11/1999 | Bennin et al. |
| 6,381,100 B1 * | 4/2002 | Bennin et al. ........... 360/245.9 |

* cited by examiner

METHOD OF MAKING INTEGRATED LEAD SUSPENSION FLEXURE WITH BALANCED PARALLEL LEADS FOR INSULATOR LAYER HYGROTHERMAL COMPENSATION

CROSS-REFERENCE TO RELATED APPLICATION

This application is a Division of U.S. patent application Ser. No. 08/993,083 filed on Dec. 18, 1997, now U.S. Pat. No. 6,381,100.

BACKGROUND OF THE INVENTION

1. Field of the Invention

The present invention relates generally to head suspensions for rigid magnetic disk drives. In particular, the present invention is a flexure portion of an integrated lead suspension having balanced lead structures that are arranged in such a way that distortion due to changes in the insulator layer is reduced.

2. Description of the Related Art

Head suspensions for supporting read/write head sliders above the rotating media in magnetic disk drives are in widespread use and disclosed generally in the Christianson et al. U.S. Pat. No. 5,461,525. Head suspensions of this type typically include a stainless steel (spring material) load beam having a mounting region on a proximal end, a rigid region having stiffening rails on its opposite sides, a radius or spring region between the rigid region and mounting region, and a gimbal or flexure located on the distal end of the load beam. In the embodiment shown in the Christianson et al. Patent, the flexure is manufactured and formed separately from the load beam and subsequently mounted to the load beam. Other types of head suspensions such as those shown in the Blaeser et al. U.S. Pat. No. 5,198,945 include what is known as an integral gimbal which is formed directly on the distal end of the load beam. The mounting region of the head suspension is adapted to be mounted to a rotary actuator in the disk drive, and typically has a base plate welded thereto for added rigidity.

A read/write head slider is mounted, usually by adhesive, to the flexure of the head suspension. The read/write head sliders are commonly electrically connected to electronic circuitry in the disk drive by lead wires. The lead wires are ultrasonically bonded, soldered or otherwise attached to terminals on the read/write head slider and extend along the length of the head suspension to the mounting region. Tabs are often included on the rigid region and mounting region to secure the lead wires to the suspension. However, lead wires are difficult to attach and add undesirable stiffness and weight to the head suspension.

Alternatives to head suspensions with conventional wire leads are known as integrated lead or "wireless" suspensions. A number of different types of integrated lead suspensions are commercially available. One such type of integrated lead suspension is disclosed generally in the Bennin U.S. Pat. No. 5,598,307. The suspension shown in this patent is fabricated from a laminated sheet of material including a stainless steel spring material layer and a copper conductive layer which are bonded together by a dielectric insulator layer. The load beam and flexure are formed from the stainless steel layer by a photolithographic chemical etching process. The integrated leads are formed from the conductive and insulator layers by a similar process.

The Bennin et al. U.S. Pat. No. 5,491,597 discloses a head suspension which is assembled from a load beam and a gimbal-interconnect assembly. The gimbal-interconnect assembly is etched from a layer of conductive spring material, coated with an insulating dielectric, and mounted to the load beam.

As disk drive technology progresses, head suspensions must be manufactured to more demanding tolerances. Factors that were of secondary importance when tolerances were less demanding are becoming increasingly important. One such factor is how the materials used to fabricate head suspensions react to changing environmental conditions. In particular, dielectric materials commonly used to form an insulator layer of the integrated lead suspension are typically formed from polar polymers which are typically hygroscopic. The use of hygroscopic materials in the insulator layer causes the insulator layer to volumetrically expand in environments with increasing relative humidity. Similarly, the volume of these dielectric materials varies with temperature. Variations in the volume of the insulator layer (caused by hygroscopic and/or thermal stresses) can affect head suspension characteristics such as static attitude.

There is a need for a flexure for an integrated lead suspension that reduces the effects from changes in the insulator layer. To be commercially viable, any such technology must balance several competing design concerns. The integrated lead suspension flexure must be designed with electrical characteristics that facilitate the attachment of and communication with the head slider. In addition, the mechanical characteristics of the integrated lead suspension flexure must be optimized. Flexure stiffness needs to be relatively low in pitch and roll axes to allow proper gimbal action, but relatively high in lateral stiffness to prevent lateral flexure distortion during drive operation. What is needed is an integrated lead suspension flexure that is relatively stable in changing environmental conditions while still allowing for appropriate gimbal action.

SUMMARY OF THE INVENTION

The present invention is an integrated lead suspension flexure and method of fabrication. The flexure has balanced integrated lead structures that are arranged and shaped in such a way that distortion due to changes in the insulator layer is reduced.

One embodiment of the integrated lead flexure comprises a metal spring layer having a metal base region, a metal head bonding platform, and one or more metal spring arms connecting the metal head bonding platform to the metal base region for flexure motion. The flexure also includes a conductive lead layer having a surface facing the metal spring layer and extending between the metal base region and the metal head bonding platform. The conductive lead layer has lead base region portions extending over the metal base region and lead suspended portions spaced from and adjacent to at least one of the metal spring arms. The flexure further includes an insulator layer between the metal spring layer and the conductive lead layer having insulator base region portions for bonding the lead base region portions to and insulating the lead base region portions from the metal base region. The insulator layer also has insulator suspended portions on a lower surface of the lead suspended portions and insulator spring arm portions on an upper surface of the metal spring arms adjacent to the lead suspended portions. A first curvature is induced on each insulator suspended portion and a second curvature is induced on each insulator spring arm portion when the insulator layer undergoes volumetric variations. The direction of the second curvature generally opposes the direction of the first curvature, and the second curvature in the insulator suspended portions compensates for the first curvature in the insulator spring arm portions.

DETAILED DESCRIPTION OF THE PREFERRED EMBODIMENTS

The dielectric materials that are commonly used in the insulator layers of conventional integrated lead suspensions are hygroscopic, i.e., they readily absorb and release moisture. When moved from a relatively dry environment to a relatively humid environment (e.g., a 50% change in relative humidity), these dielectric materials absorb moisture from the environment and volumetrically expand. Conversely, when moved from a relatively humid environment to a relatively dry environment, these dielectric materials release absorbed moisture and volumetrically contract.

Figure 1A:
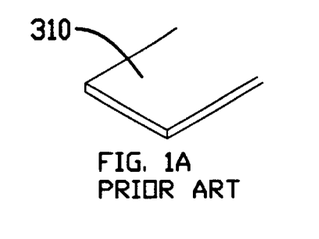
FIGS. 1A–1E are cross sectional isometric views of various conventional combinations of dielectric and metal layers under relatively dry conditions.
Figure 1B:
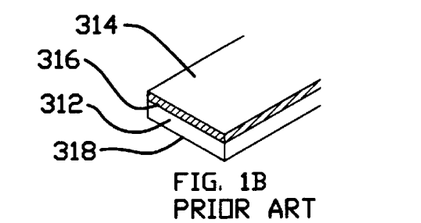
Figure 1C:
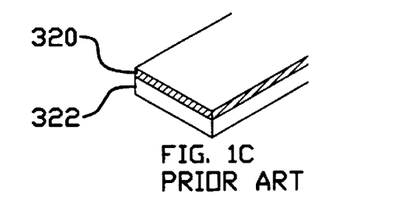
Figure 1D:
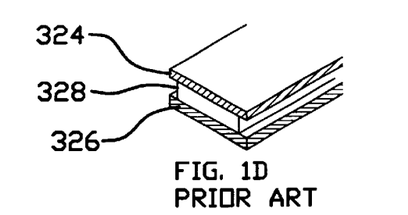
Figure 1E:
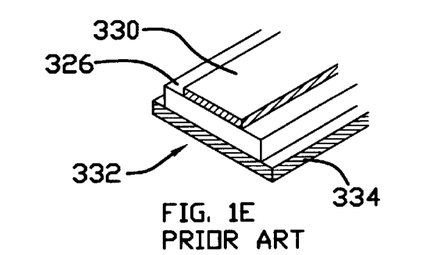
Figure 2A:
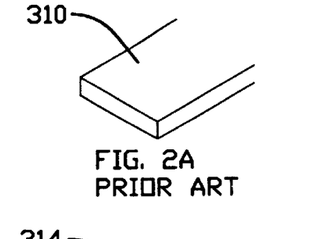
FIGS. 2A–2E are cross sectional isometric views of the structures shown in FIGS. 1A–1E, respectively, under relatively humid conditions.
Figure 2B:
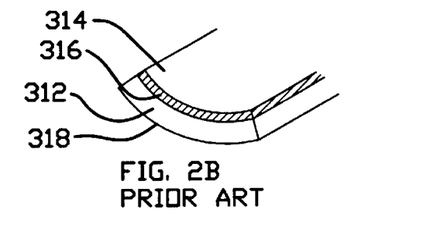
Figure 2C:
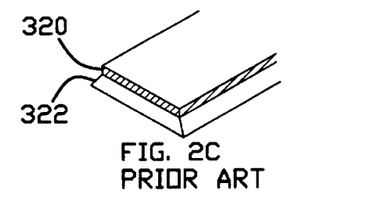
Figure 2D:
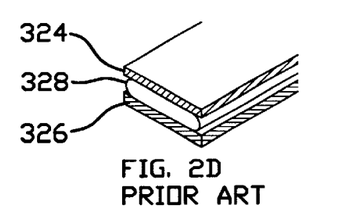

FIGS. 1A–1E and 2A–2E generally illustrate how various conventional combinations of dielectric and metal layers undergo hygroscopic deformation when moved from a relatively dry environment (shown in FIGS. 1A–1E) to a relatively humid environment (shown in FIGS. 2A–2E). FIG. 1A shows a relatively dry free dielectric film 310 (e.g., polyimide or epoxy). When subjected to relatively humid conditions, the film expands volumetrically in all directions as shown in FIG. 2A. FIG. 1B shows a dielectric film 312 attached to a sheet of relatively thin, thus relatively low stiffness, metal 314 (e.g., a 20 micrometer thick sheet of 302 stainless steel). As shown in FIG. 2B, when subjected to relatively humid conditions a face 316 of the film 312 that is attached to the metal sheet 314 cannot expand while a free face 318 can expand. This causes an unbalanced internal strain which results in a material curvature as shown in FIG. 2B. When a relatively thicker, thus relatively higher stiffness, supporting sheet 320 (e.g., a 75 micrometer thick sheet of 302 stainless steel) is attached to a dielectric film 322, as is shown in FIG. 2C, curvature is reduced in relatively humid conditions. Curvature can also be reduced, as shown in FIGS. 1D and 2D, by attaching metal sheets 324 and 326 to two opposing faces of a dielectric film 328, which allows midplane expansion of the dielectric film 328 while anchoring the top and bottom dielectric surfaces to prevent general curvature.

Figure 2E:
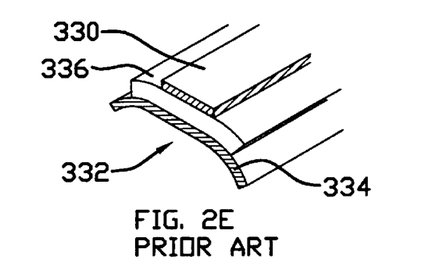

FIG. 1E depicts a portion 332 of a conventional integrated lead structure with a conductive lead 330. A metal layer 334 with a relatively low stiffness in the pitch and roll directions (e.g., a 20 micrometer thick sheet of 302 stainless steel) is used so as to allow gimbaling action. However, this relatively low stiffness allows a curvature to develop when the portion 332 is subjected to relatively humid conditions as shown in FIG. 2E. Although the lead 330 is attached to a portion of a dielectric film 336 opposite the metal layer 334, the lead's surface area is smaller than that of the dielectric portion 336, which allows lateral expansion of the dielectric top surface resulting in curvature.

Also, the dielectric materials that are commonly used in the insulator layers of conventional integrated lead suspensions typically have thermal coefficients of expansion that are relatively higher than the thermal coefficients of expansion of the metals commonly used in the metal spring and conductive lead layers of conventional integrated lead suspensions. When exposed to temperature changes, the dielectric layers used in the insulator layers will expand (and contract) to a greater degree than the surrounding metal layers, and curvature effects fairly similar to the humidity curvature effects shown in FIGS. 1A–1E and 2A–2E will occur to some degree. Thus, the hygroscopic and/or thermal (i.e., "hydrothermal") properties of the insulator layer materials can produce changes in the insulator layer that can affect head suspension characteristics such as static attitude.

Figure 3:
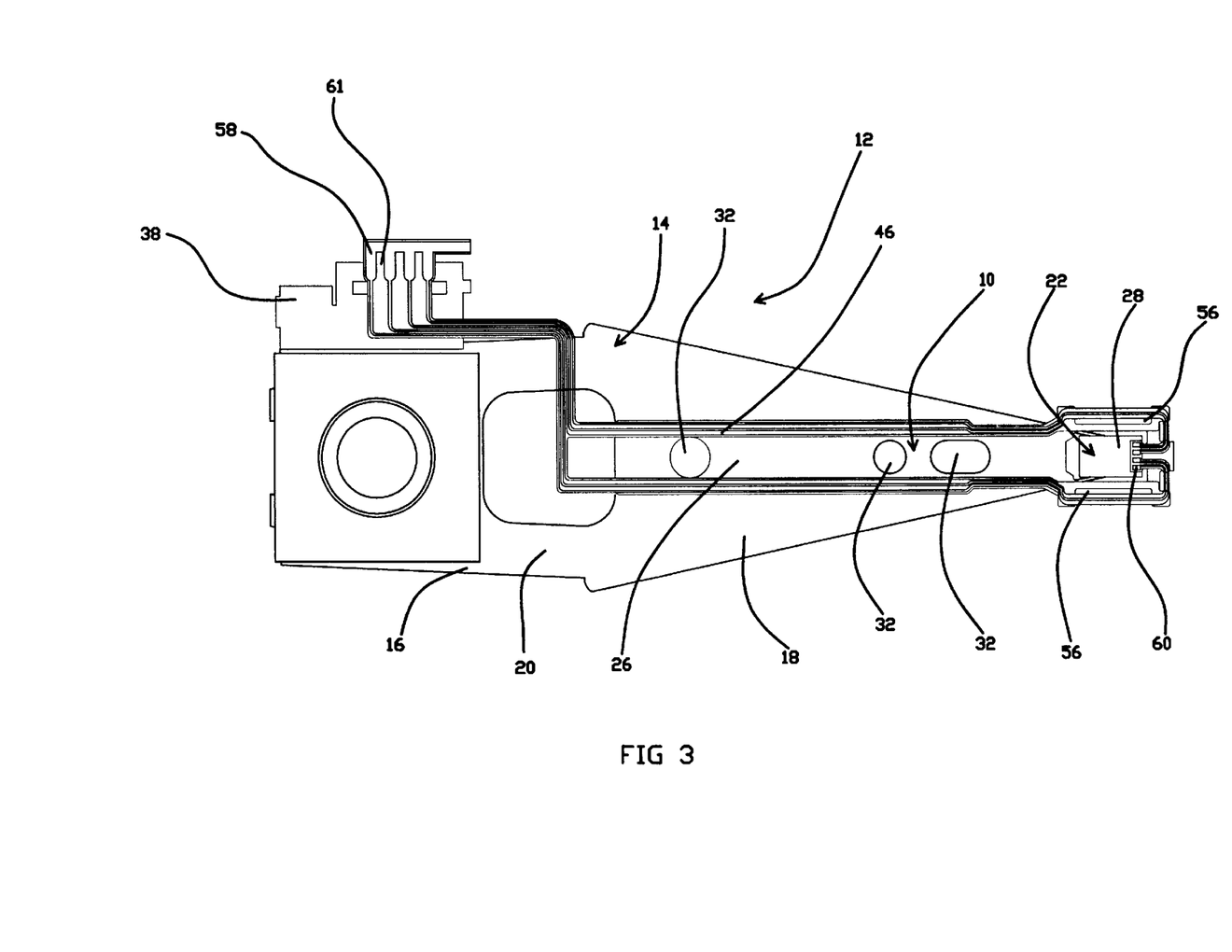
FIG. 3 is a top view of a head suspension having a flexure according to one embodiment of the present invention.
Figure 4:
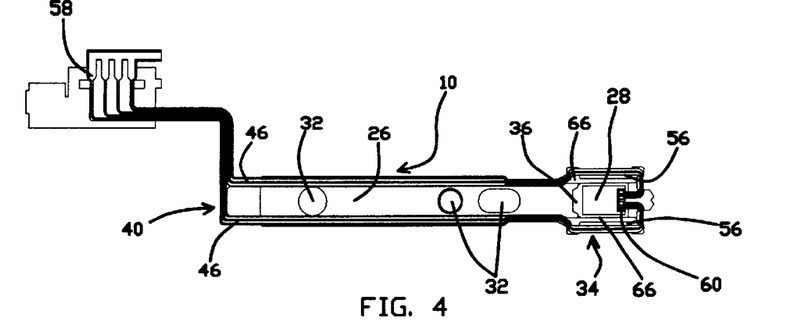
FIG. 4 is a top view of the flexure of the head suspension shown in FIG. 3.
Figure 5A:
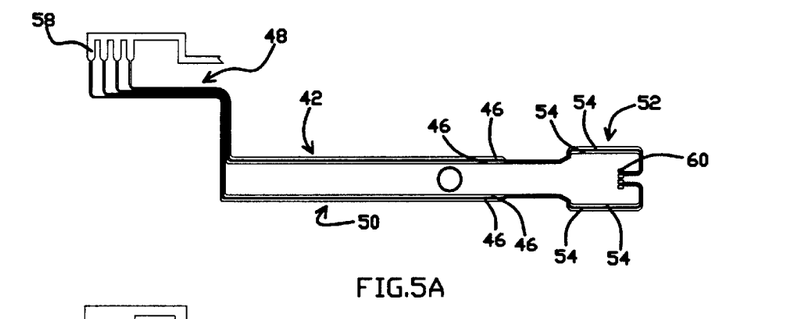
FIGS. 5A–5C are top views of the conductive lead layer, the insulator layer, and the metal spring layer, respectively, of the flexure shown in FIG. 4.
Figure 5B:
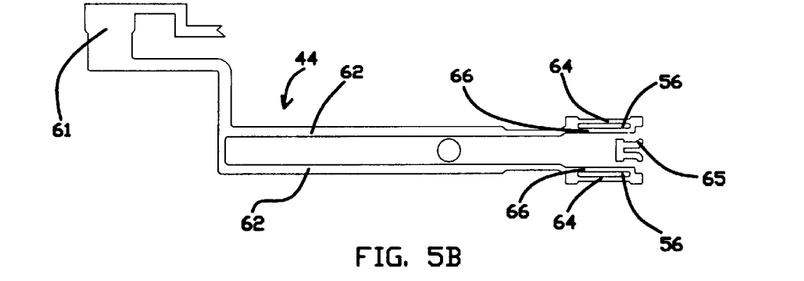
Figure 5C:
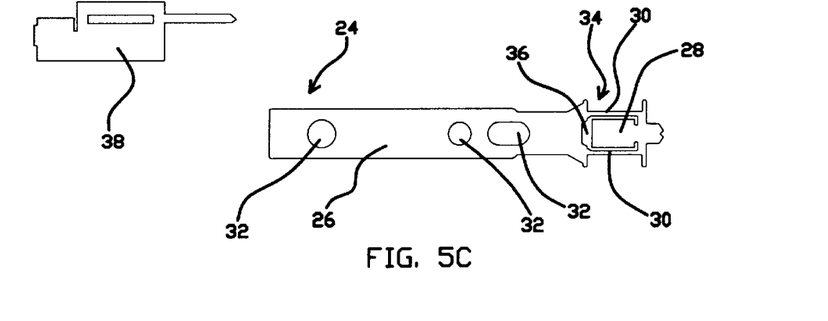
Figure 6:
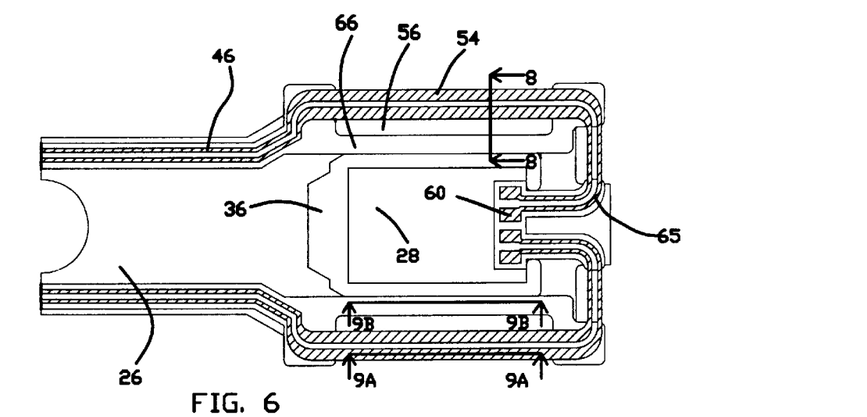
FIG. 6 is a detailed top view of the gimbal region of the flexure shown in FIG. 4.
Figure 7A:
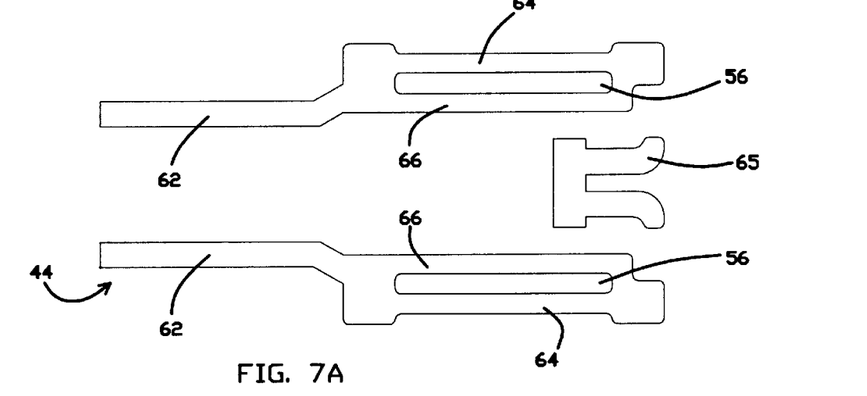
FIGS. 7A–7B are top views of the insulator layer and the metal spring layer, respectively, of the gimbal region shown in FIG. 6.
Figure 7B:
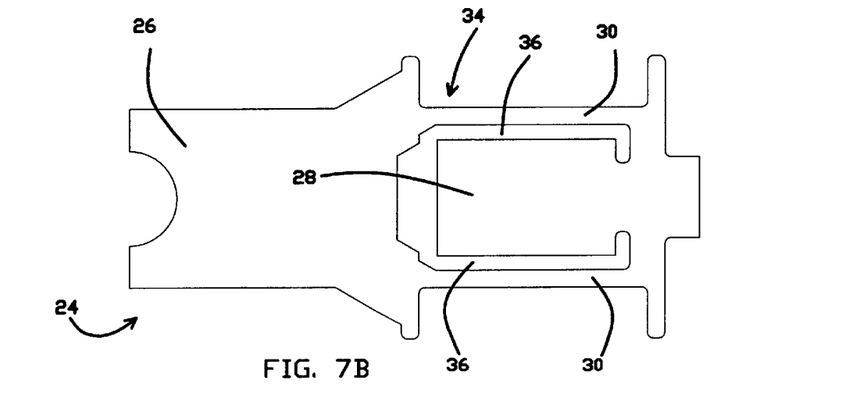
Figure 8:
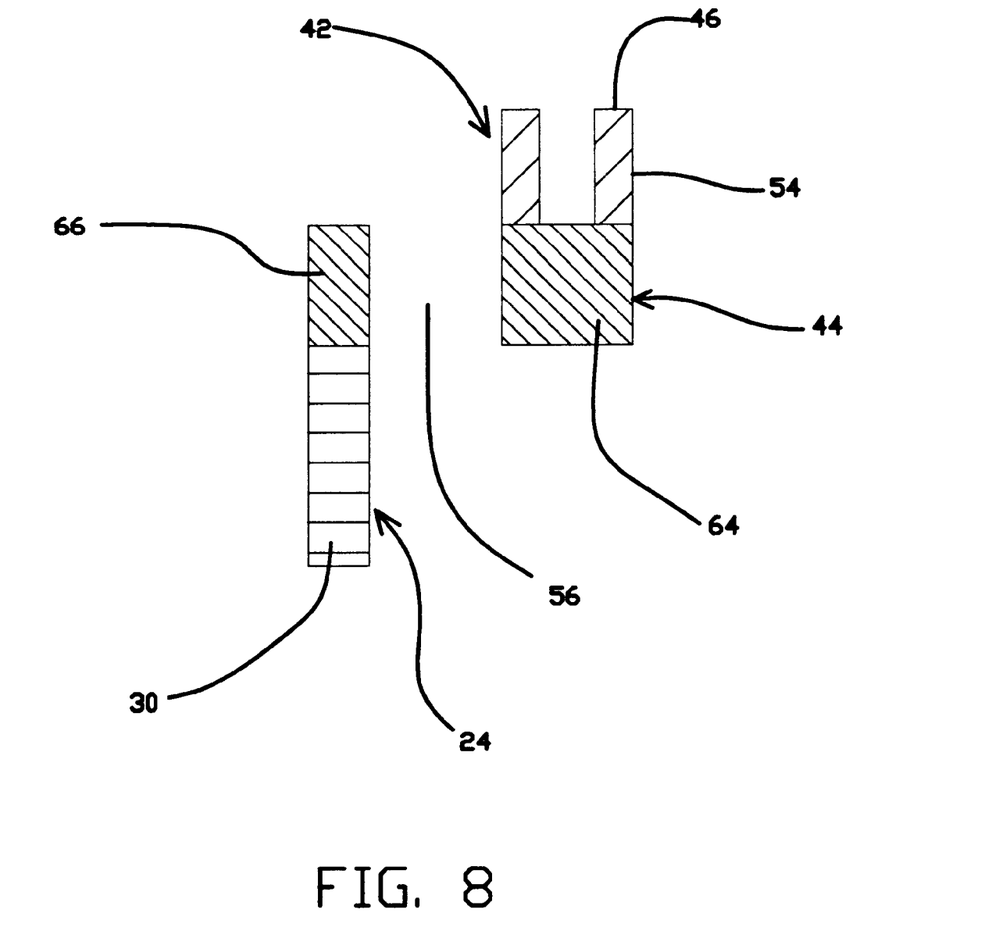
FIG. 8 is a cross sectional view of a spring arm portion of the flexure shown in FIG. 6 taken across lines 8—8.

FIG. 3 shows a head suspension 12 having an integrated lead flexure 10 in accordance with the present invention mounted to a distal end of a load beam 14. Load beams such as 14 are well known and commercially available from a number of sources including Hutchinson Technology Incorporated of Hutchinson, Minn., the assignee of the present invention. Typically, load beam 14 includes a mounting region 16 at its proximal end, a relatively rigid region 18, and a spring region 20 between the mounting region 16 and the rigid region 18. The flexure 10 is welded or otherwise attached to the load beam 14 and is adapted to have a head slider (not shown) adhesively bonded to a slider bonding region 22.

Flexure 10 can be described in greater detail with reference to FIGS. 3–9. The integrated lead flexure 10 includes a metal spring layer 24 (perhaps best shown in FIG. 5C) with first (upper) and second (lower) surfaces having a metal base region 26, a metal head bonding platform 28, and a plurality of metal spring arms 30 connecting the metal head bonding platform 28 to the metal base region 26. The metal base region 26 is located at a proximal end of the flexure 10 and is attached to the relatively rigid region 18 of the load beam 14. In the embodiment shown in FIGS. 3–8, the metal base region 26 also includes holes 32 that may be used to align the flexure 10 about corresponding holes in the relatively rigid region 18 when the flexure 10 is attached to the load beam 14. Extending from the metal base region 26 is a metal gimbal region 34 that includes the metal head bonding platform 28 which is connected to the metal base region 26 by a pair of metal spring arms 30 so as to allow motion about the pitch and roll axes. The metal head bonding platform 28 is adapted for attachment and support of the head slider (not shown) and is located adjacent to and in between the spring arms 30. In the embodiment shown in FIGS. 3–8, the metal head bonding platform 28 is a tongue-shaped cantilever beam extending from the distal tip of the flexure 10 towards the metal base region 26 and is separated from the metal base region 26 and the metal spring arms 30 by a gap 36. Also, the metal spring layer 24 includes a metal mounting region island 38 that extends over a lateral edge of the mounting region 16 of the load beam 14 and beyond the lateral edge of the mounting region 16.

The integrated lead flexure 10 also includes a lead structure 40 comprising a conductive lead layer.42 atop a hygroscopic insulator layer 44. The conductive lead layer 42 (perhaps best shown in FIG. 5A) has first (upper) and second (lower) opposed surfaces with the lower surface of the conductive lead layer 42 facing the upper surface of the metal spring layer 24 and generally separated therefrom by the insulator layer 44. Elongated, generally parallel signal leads 46 are formed in the conductive lead layer 42. Typically, the leads 46 are formed in pairs with an equal number of leads 46 on each lateral side of the flexure 10. The exact number and shape of the leads 46 are determined by the desired mechanical properties of the head suspension and by the electrical requirements of the head slider and the amplifying and processing circuitry (not shown) used to process the signals from the head slider. The leads 46 comprise lead mounting region portions 48 that extend generally over and beside the mounting region 16 of the load beam 14 and the metal mounting region island 38, lead base region portions 50 that extend over the metal base region 26, and lead gimbal portions 52 that generally extend over the metal gimbal region 34. The lead gimbal portions 52 are generally backed by the metal gimbal region 34 except for lead suspended portions 54 that are adjacent to the metal spring arms 30 and separated therefrom by gaps 56 (perhaps best shown in FIGS. 4 and 6). The leads 46 terminate in mounting region bonding pads 58 at proximal ends of the lead mounting region portions 48. The mounting region bonding pads 58 are electrically connected using conventional bonding techniques to amplifying and processing circuitry placed on the actuator arm or as part of the disk drive. At distal ends of the lead gimbal portions 52, the leads 46 terminate in slider bonding pads 60 that are electrically connected to the head slider (not shown). In the embodiment shown in FIGS. 3–8, the slider bonding pads 60 are located on the metal head bonding platform 28.

The hygroscopic insulator layer 44 (perhaps best shown in FIG. 5B) of flexure 10, having first (upper) and second (lower) surfaces, is generally located between the metal spring layer 24 and the conductive lead layer 42 with the upper surface of the insulator layer 44 facing the lower surface of the conductive lead layer 42 and the lower surface of the insulator layer 44 facing the upper surface of the metal spring layer 24. In particular, the insulator layer 44 comprises insulator mounting region portions 61 that bond the lead mounting portions 48 to the metal mounting region island 38 and insulator base region portions 62 that bond the lead base region portions 50 to the metal base region 26. The insulator layer 44 also comprises a pair of insulator suspended portions 64 that have their upper surfaces bonded to the lower surfaces of the lead suspended portions 54 and their lower surfaces free from the metal spring layer 24 and a pair of insulator spring arm portions 66 adjacent to the insulator suspended portions 64 and separated therefrom by gaps 56. The insulator spring arm portions 66 have their lower surfaces bonded to the upper surfaces of the metal spring arms 30 and their upper surfaces free from the conductive lead layer 42. At the distal end of the insulator layer 44 is an insulator distal tip island 65 bonded to distal portions of both the leads 46 and the metal gimbal region 34.

Figure 9A:
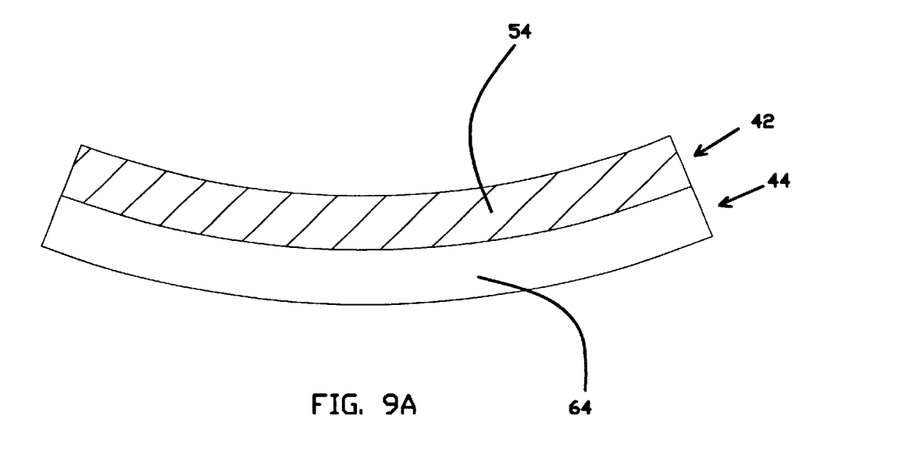
FIGS. 9A–9B are cross sectional views of an insulator suspended portion and an insulator spring arm portion, respectively, of the flexure shown in FIG. 6 taken across lines 9A—9A and 9B—9B, respectively.
Figure 9B:
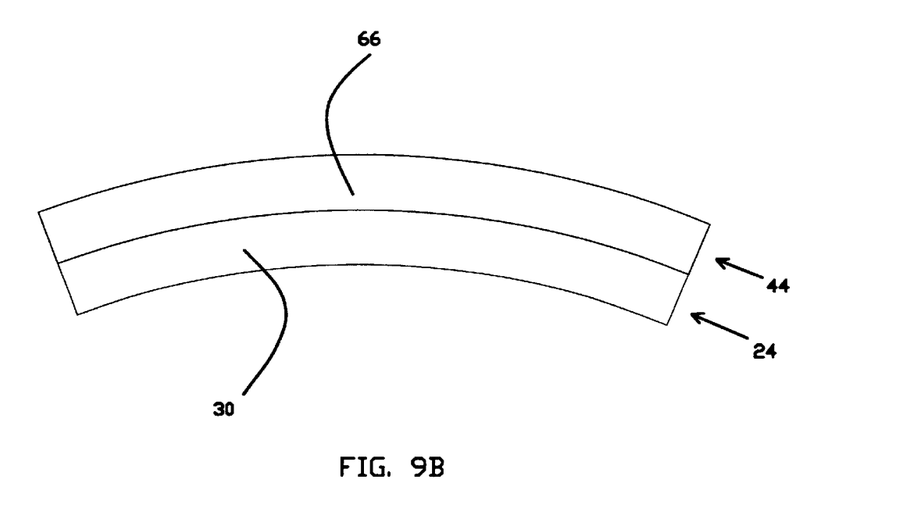

As shown in FIG. 9A, when the insulator layer 44 volumetrically expands due to exposure to relatively humid conditions, the insulator suspended portions 64 induce a first curvature that forms a generally concave shape in the upper surface of the insulator suspended portions 64. As shown in FIG. 9B, when the insulator layer 44 volumetrically expands due to exposure to relatively humid conditions, the insulator spring arm portions 66 induce a second curvature that forms a generally convex shape in the upper surface of the insulator spring arm portions 66 having a magnitude similar to the first curvature and curving in a direction generally opposite that of the first curvature. By arranging the insulator suspended portions 64 and the insulator spring arm portions 66 in a balanced manner so that there are insulator suspended portions 64 and insulator spring arm portions 66 on each lateral side of the gimbal region with the direction of the first curvature generally opposing the direction of the second curvature, the net effect on the static attitude of the slider bonding region 22 from expansion of the insulator layer 44 is minimized.

Generally, experiments have shown that an arrangement that substantially matches the ratio of the inherent stiffness of the lead suspended portions 54 and the surface area of the insulator suspended portions 64 with the ratio of the inherent stiffness of the metal spring arms 30 and the surface area of the insulator spring arm portions 66 effectively cancels the effects of the two curvatures on the slider bonding region 22. In the embodiment shown in FIGS. 3–8, the insulator suspended portions 64 and insulator spring arm portions 66 are arranged with an equal number of insulator suspended portions 64 (along with corresponding lead suspended portions 54) on each lateral side of the flexure 10 and an equal number of insulator spring arm portions 66 (along with corresponding metal spring arms 30) on each lateral side of the flexure 10.

Figure 10:
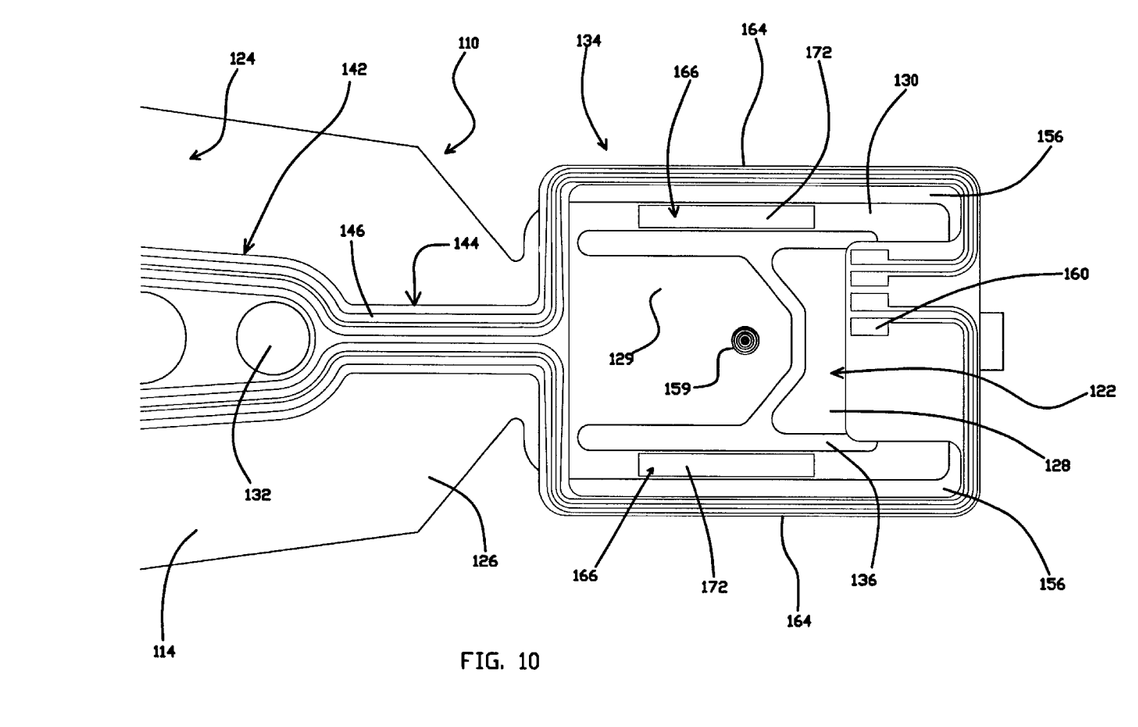
FIG. 10 is a top view of a gimbal region of a flexure according to a second embodiment of the present invention.

The gimbal region of an integrated lead suspension flexure 110, a second embodiment of the present invention, is shown in FIG. 10. The flexure 110 is similar to flexure 10 (except as described below) and can be fabricated using similar processes described below. Elements of flexure 110 that have corresponding elements in flexure 10 are referenced with numerals that are incremented by one hundred (e.g., the metal spring layer 24 of flexure 10 corresponds to metal spring layer 124 of flexure 110). In flexure 110, the metal spring layer 124 is formed integrally with a load beam 114 so that the metal gimbal region 134 extends from a distal end of the load beam 114. The metal gimbal region 134 includes a metal head bonding platform 128 extending from the distal end of the metal gimbal region 134 and a load point platform 129 extending from the metal base region 126. The metal head bonding platform 128 and the load point platform 129 are separated from each other and from metal spring arms 130 by gap 136. The metal gimbal region 134 further includes a dimple 159 that forms a generally spherical, convex protrusion in the upper surface of the load point platform 129 that provides clearance between the head slider and the load point platform 129 and serves as a point about which the slider can gimbal. Also, signal leads 146 formed in a conductive lead layer 142 terminate at a distal end in slider bonding pads 160 that are arranged non-symmetrically about a longitudinal axis of flexure 110.

Deformation due to expansion of the insulator layer 144 is compensated for in the flexure 110 by a balanced arrangement of the insulator suspended portions 164 and the insulator spring arm portions 166. Also, the insulator spring arm portions 166 of the flexure 110 comprise elongated insulator islands 172 atop an upper surface of the metal spring arms 130. When the insulator layer 144 volumetrically expands due to exposure to relatively humid conditions, the insulator suspended portions 164 induce a first curvature (similar to the first curvature induced in the flexure 10 shown in FIG. 9A) that forms a generally concave shape in the upper surface of the insulator suspended portions 164 and the insulator spring arm portions 166 induce a second curvature (similar to the second curvature induced in the flexure 10 shown in FIG. 9B) that forms a generally convex shape in the upper surface of the insulator spring arm portions 166 having a magnitude similar to the first curvature and curving in a direction generally opposite that of the first curvature. The balanced arrangement of the insulator suspended portions 164 and the insulator spring arm portions 166 with the direction of the first curvature opposing the direction of the second curvature minimizes the net effect on the static attitude of the slider bonding region 122 from volumetric expansion of the insulator layer 144.

Figure 11:
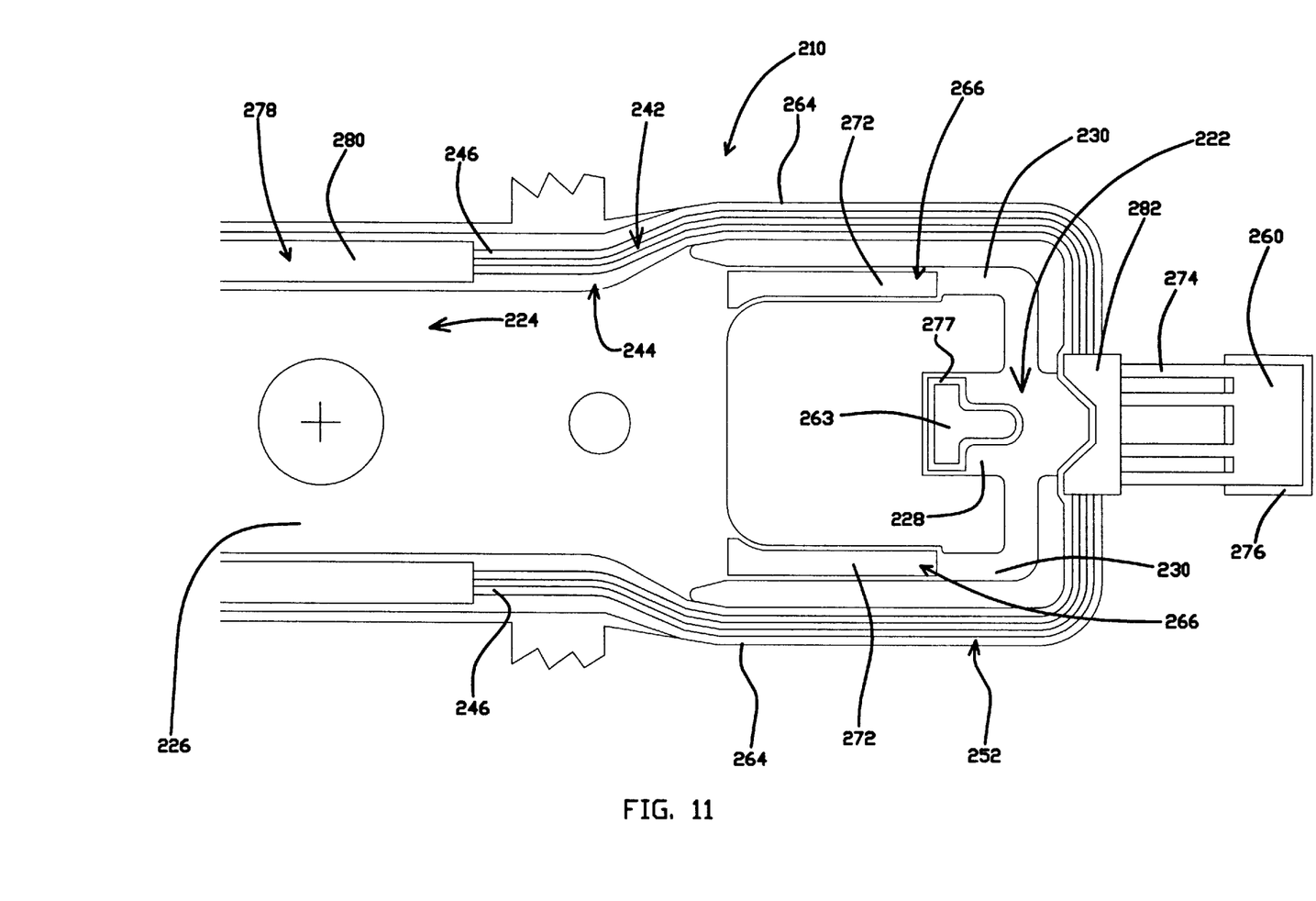
FIG. 11 is a top view of a gimbal region of a flexure according to a third embodiment of the present invention.

The gimbal region of an integrated lead suspension flexure 210, a third embodiment of the present invention, is shown in FIG. 11. The flexure 210 is similar to flexure 10 (except as described below) and can be fabricated using similar processes. Elements of flexure 210 that have corresponding elements in flexure 10 are referenced with numerals that are incremented by two hundred (e.g., the metal spring layer 24 of flexure 10 corresponds to metal spring layer 224 of flexure 210). Signal leads 246 are formed in the conductive lead layer 242 and terminate in a single electrical shunt bar 260 connected to the distal end of the lead gimbal region 252 by bare lead suspended portions 274, which are free from both the metal spring layer 224 and the insulator layer 244. The insulator layer 244 further includes insulator bonding pad islands 276 and 277. Insulator bonding pad island 276 is bonded to the lower surface of the shunt bar 260, while insulator bonding pad island 277 is formed on the upper surface of the metal head bonding platform 228. Also, the flexure 210 comprises a cover layer 278 of dielectric including portions 280 and 282 that cover portions of the upper surface of the conductive lead layer 242. The cover layer 278 further includes a bonding platform island 263 that covers a portion of the upper surface of the insulator bonding pad island 277.

Deformation due to expansion of the insulator layer 244 is compensated for in the flexure 210 by a balanced arrangement of the insulator suspended portions 264 and the insulator spring arm portions 266. Flexure 210 includes insulator spring arm portions 266 comprising elongated insulator islands 272 atop an upper surface of the metal spring arms 230. When the insulator layer 244 volumetrically expands due to exposure to relatively humid conditions, the insulator suspended portions 264 induce a first curvature (similar to the first curvature induced in the flexure 10 shown in FIG. 9A) that forms a generally concave shape in the upper surface of the insulator suspended portions 264 and the insulator spring arm portions 266 induce a second curvature (similar to the second curvature induced in the flexure 10 shown in FIG. 9B) that forms a generally convex shape in the upper surface of the insulator spring arm portions 266 having a magnitude similar to the first curvature and curving in a direction generally opposite that of the first curvature. As in flexures 10 and 110, flexure 210 has a balanced arrangement of the insulator suspended portions 264 and the insulator spring arm portions 266 with the direction of the first curvature opposing the direction of the second curvature in order to minimize the net effect of volumetric expansion of the insulator layer 244 on the static attitude of the slider bonding region 222.

Figure 12:
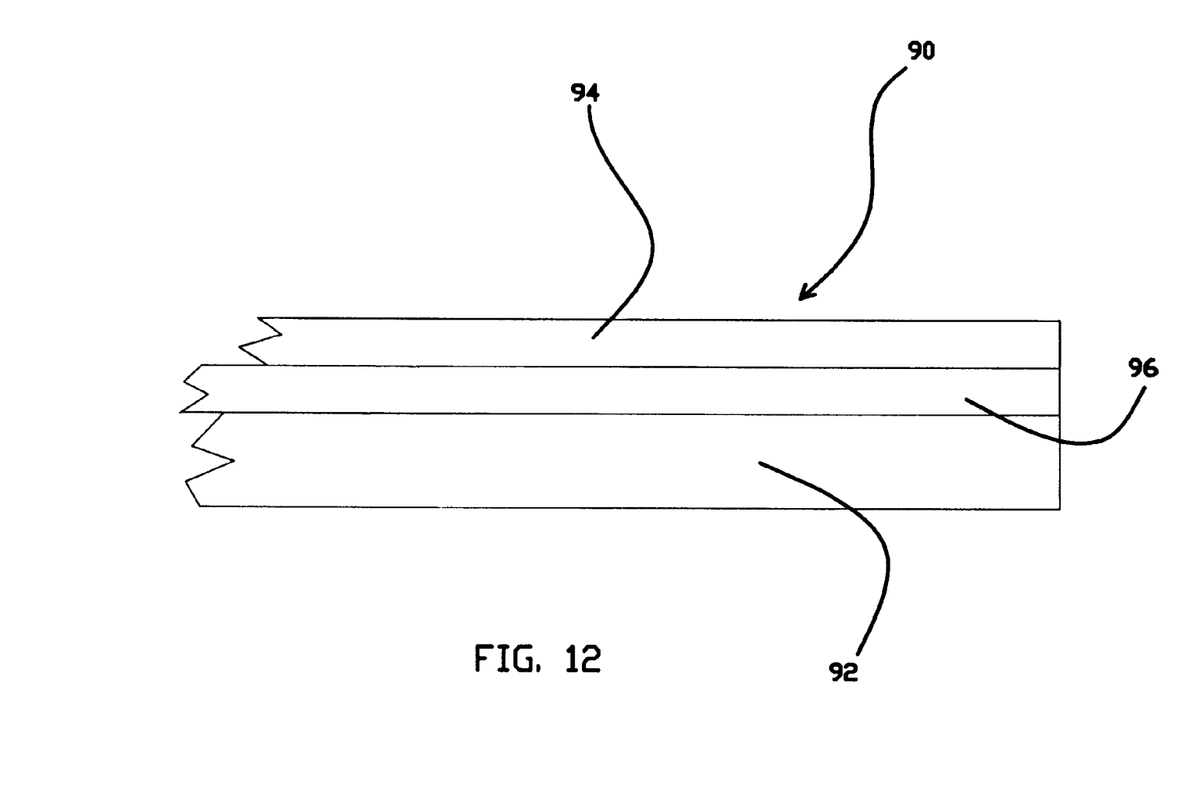
FIG. 12 is a cross sectional view of a laminate used to fabricate a flexure in accordance with the present invention.

A method for fabricating the flexure 10 (and, similarly, flexures 110 and 210) includes providing a laminated material sheet 90 such as that shown in FIG. 12. Laminated sheet 90 includes a spring metal layer 92 and a conductive metal layer 94 which are separated from one another and bonded together by a dielectric insulator layer 96. Laminated sheets such as 90 are commercially available from a number of sources including Rogers Corporation of Chandler, Ariz. In one embodiment, the spring metal layer 92 is a stainless steel layer having a thickness of about 18 micrometers to 25 micrometers. Conductive metal layer 94 is a layer of C7025 copper alloy having a thickness of about 10 micrometers to 18 micrometers. Dielectric layer 96 is a polyimide layer having a thickness of about 10 micrometers to 18 micrometers. The flexure fabrication method further includes the steps of forming the metal spring layer 24 in the spring metal layer 92, forming the conductive lead layer 42 in the conductive metal layer 94, and forming the insulator layer 44 in the dielectric layer 96 using photolithographic etching processes. Alternatively, flexure 10 can be fabricated using an additive process wherein the insulator and conductive lead layers 44 and 42 are deposited on a metal spring layer using commonly known deposition techniques such as vapor deposition. Dielectric cover layer 278 can also be formed as a polyimide layer using commonly known methods such as photolithography.

The flexure of the present invention offers a number of important advantages. The effects on the slider bonding region from hydrothermal changes in the insulator layer can be reduced without substantially increasing the stiffness of the gimbal region. Therefore, the flexure can provide increased environmental stability while still allowing appropriate gimbal action. Additionally, the flexure of the present invention can be fabricated from a laminate using photolithographic chemical etching processes which are efficient, accurate, and economical.

Although the present invention has been described with reference to preferred embodiments, those skilled in the art will recognize that changes may be made in form and detail without departing from the spirit and scope of the invention.

What is claimed is:

1. A method of fabricating an integrated lead suspension flexure, comprising the following steps:
  forming a metal spring layer having first and second opposed surfaces, wherein the metal spring layer includes:
    a metal base region;
    a metal head bonding platform; and
    one or more metal spring arms connecting the metal head bonding platform to the metal base region for flexure motion;
  forming a conductive lead layer having first and second opposed surfaces, the second surface facing the first surface of the metal spring layer, and extending between the metal base region and the metal head bonding platform, wherein the conductive lead layer includes:
    lead base region portions extending over the metal base region; and
    lead suspended portions spaced from and adjacent to at least one of the metal spring arms; and
  forming an insulator layer between the metal spring layer and the conductive lead layer, wherein the insulator layer includes:

insulator base region portions for bonding the lead base region portions to and insulating the lead base region portions from the metal base region;

insulator suspended portions on the second surface of the lead suspended portions, wherein a first direction curvature is induced on each insulator suspended portion when the insulator layer undergoes volumetric variations; and insulator spring arm portions on the first surface of the metal spring arms adjacent to the lead suspended portions, wherein a second direction curvature is induced on each insulator spring arm portion when the insulator layer undergoes volumetric variations, wherein the second direction is generally opposite the first direction and the second direction curvature in the insulator spring arm portions compensates for the first direction curvature in the insulator suspended portions.

2. The method of claim 1, further comprising providing a laminate in which the spring metal layer comprises stainless steel, the conductive lead layer comprises copper or copper alloy, and the insulator layer comprises polyinide.

3. The method of claim 1, wherein the metal spring layer forming step comprises forming the metal spring layer integrally with a distal end of a load beam.

4. The method of claim 1, wherein the metal spring layer, conductive lead layer, insulator layer forming steps comprise photolithographic chemical etching.

5. The method of claim 1, further comprising the step of forming a cover layer on the first surface of the conductive lead layer.

6. The method of claim 1, wherein the metal spring layer forming step, the conductive lead layer forming step, and the insulator layer forming step include arranging the insulator suspended portions and the insulator spring arm portions in a balanced manner with insulator suspended portions and insulator spring arm portions on each lateral side of the flexure.

7. The method of claim 6, wherein the metal spring layer forming step, the conductive lead layer forming step, and the insulator layer forming step include forming the insulator suspended portions and insulator spring arm portions so that the insulator suspended portions are arranged with the same number of insulator suspended portions on each lateral side of the flexure and so that the insulator spring arm portions are arranged with the same number of insulator spring arm portions on each lateral side of the flexure.

8. The method of claim 1, wherein the metal spring layer forming step, the conductive lead layer forming step, and the insulator layer forming step are adapted so that the ratio of the inherent stiffness of the lead suspended portions and the surface area of the insulator suspended portions substantially matches the ratio of the inherent stiffness of the metal spring arms and the surface area of the insulator spring arm portions.

9. The method of claim 1, further comprising the step of forming a cover layer facing the first surface of the conductive lead layer.

10. The method of claim 1, wherein the insulator layer forming step forms insulator spring arms portions comprising insulator islands formed atop an upper surface of the metal spring arms.

11. A method of fabricating an integrated lead suspension flexure, comprising the following steps:

forming a metal spring layer having first and second opposed surfaces, wherein the metal spring layer includes:

a metal base region;
a metal head bonding platform; and
one or more metal spring arms connecting the metal head bonding platform to the metal base region;

forming a conductive lead layer having first and second opposed surfaces, the second surface facing the first surface of the metal spring layer, and extending between the metal base region and the metal head bonding platform, wherein the conductive lead layer includes:

lead base region portions extending over the metal base region; and lead suspended portions spaced from and adjacent to at least one of the metal spring arms; and forming an insulator layer between the metal spring layer and the conductive lead layer, wherein the insulator layer includes:

insulator base region portions for bonding the lead base region portions to and insulating the lead base region portions from the metal base region;

insulator suspended portions on the second surface of the lead suspended portions, wherein a first direction curvature is induced on each insulator suspended portion when the insulator layer undergoes volumetric variations;

insulator spring arm portions on the first surface of the metal spring arms adjacent to the lead suspended portions, wherein a second direction curvature is induced on each insulator spring arm portion when the insulator layer undergoes volumetric variations, wherein the second direction is generally opposite the first direction and the second direction curvature in the insulator spring arm portions compensates for the first direction curvature in the insulator suspended portions; and providing a laminate of at least a portion of the spring metal layer and the conductive lead layer and the insulator layer in between the spring metal layer and the conductive metal layer.

12. The method of claim 11, wherein the providing step comprises providing the laminate in which the spring metal layer comprises stainless steel, the conductive lead layer comprises copper or copper alloy, and the insulator layer comprises polyimide.

13. The method of claim 11, wherein the metal spring layer forming step comprises forming the metal spring layer integrally with a distal end of a load beam.

14. The method of claim 11, wherein the metal spring layer, conductive lead layer, and insulator layer forming steps comprise photolithographic chemical etching.

15. The method of claim 11, further comprising the step of forming a cover layer on the first surface of the conductive lead layer.

16. The method of claim 11, wherein the metal spring layer forming step, the conductive lead layer forming step, and the insulator layer forming step include arranging the insulator suspended portions and the insulator spring arm portions in a balanced manner with insulator suspended portions and insulator spring arm portions on each lateral side of the flexure.

17. The method of claim 16, wherein the metal spring layer forming step, the conductive lead layer forming step, and the insulator layer forming step include forming the insulator suspended portions and insulator spring arm portions so that the insulator suspended portions are arranged with the same number of insulator suspended portions on each lateral side of the flexure and so that the insulator spring arm portions are arranged with the same number of insulator spring arm portions on each lateral side of the flexure.

18. The method of claim 11, wherein the metal spring layer forming step, the conductive lead layer forming step, and the insulator layer forming step are adapted so that the ratio of the inherent stiffness of the lead suspended portions and the surface area of the insulator suspended portions substantially matches the ratio of the inherent stiffness of the metal spring arms and the surface area of the insulator spring arm portions.

19. The method of claim 11, further comprising the step of forming a cover layer facing the first surface of the conductive lead layer.

20. The method of claim 11, wherein the insulator layer forming step forms insulator spring arms portions comprising insulator islands formed atop an upper surface of the metal spring arms.

* * * * *